United States Patent [19]

Whittaker et al.

[11] Patent Number: 5,146,596
[45] Date of Patent: Sep. 8, 1992

[54] MULTIPROCESSOR MULTIFUNCTION ARBITRATION SYSTEM WITH TWO LEVELS OF BUS ACCESS INCLUDING PRIORITY AND NORMAL REQUESTS

[75] Inventors: Bruce E. Whittaker, Mission Viejo; Saul Barajas, Capistrano Beach; Leland E. Watson, Mission Viejo, all of Calif.

[73] Assignee: Unisys Corporation, Blue Bell, Pa.

[21] Appl. No.: 471,904

[22] Filed: Jan. 29, 1990

[51] Int. Cl.⁵ .......................................... G06F 13/14
[52] U.S. Cl. ............................ 395/725; 364/285.3; 364/242.9
[58] Field of Search ... 364/200 MS File, 900 MS File; 395/725

[56] References Cited

U.S. PATENT DOCUMENTS

| | | | |
|---|---|---|---|
| 4,009,470 | 2/1977 | Danilenko et al. | 364/200 |
| 4,096,571 | 6/1978 | Vander Mey | 364/200 |
| 4,326,250 | 4/1982 | McCullough | 364/200 |
| 4,870,704 | 9/1989 | Matelan | 364/200 |

Primary Examiner—Lawrence E. Anderson
Attorney, Agent, or Firm—Alfred W. Kozak; Mark T. Starr

[57] ABSTRACT

Arbitration and control circuitry for monitoring the two processors sharing a system bus to insure fair access to system resources and to sense error conditions which occur in order to hold access for the processor involved until the error condition is cleared. The arbitration circuitry provides for two levels of bus access requests where one level involves normal requests and a second level involves priority request which take precedence over normal requests.

3 Claims, 3 Drawing Sheets

MULTIPROCESSOR MULTIFUNCTION ARBITRATION SYSTEM WITH TWO LEVELS OF BUS ACCESS INCLUDING PRIORITY AND NORMAL REQUESTS

The arbitration circuitry provides for two levels of bus access requests where one level involves normal requests and a second level involves priority request which take precedence over normal requests.

BACKGROUND OF THE INVENTION

As developments unfold in the size reduction and compactness of data processing systems and with the continuing increase in the density of integrated circuit chips, it is seen that more and more logic circuitry, including computer processors can be built into smaller physical modules. This allows multiple numbers of processors to be implemented where previously only a single or a portion of a single processor was usually resident.

However, the system buses which connect the various elements and parts of a computer system together, that is to say, the buses which connect the processor to the main memory and to the input/output subsystem, cannot necessarily be reduced proportionately in physical size in the manner by which the processors and memories are reduced in size.

Since it is necessary for multiple processors to share the various system resources, some control must be provided for bus-sharing. This disclosure presents a system for providing a very simple and very low-cost arbitration circuit system or "Arbiter".

SUMMARY OF THE INVENTION

Arbitration circuitry, residing in a Programmable Array Logic chip, enforces a set of rules which permit two processors, sharing a system bus, to get fair access to the bus and the resources connected to it.

The arbitration logic rules prevent simultaneous access to the shared bus but prevent any one processor from monopolizing the bus. Further, the logic permits a processor to hold the bus until it deactivates its hold and further prevents bus access if the bus is busy. The logic is especially sensitive to error conditions which occur in a resource, such as main memory or cache memory, and in this situation, will hold the active processor on the bus until the error is corrected while denying access to the non-involved processor.

DESCRIPTION OF PREFERRED EMBODIMENT

The arbitration system presented herein provides a low-cost "Arbiter" for arbitration circuitry for controlling the sharing of a system bus by two processors housed on the same logic card. The arbitration circuitry or "Arbiter" is implemented in a single logic chip such as the industry standard "PAL" or "Programmable Array Logic". This chip is generally a small, 24-pin DIP(dual in-line pin) chip. One useful example of this type chip is the chip designation 22V10 PAL as manufactured by American Micro Devices Company, whose address is 901 Thompson Place, Sunnyvale, Calif. 94088.

The "Arbiter" for bus access must provide the following features:

(a) it must prevent simultaneous access to the bus by both processors;
(b) it must allow equal access opportunities for the two processors. It also must prevent either processor from being "starved" or denied essential access to the bus;
(c) it must prevent either processor getting access to the system bus if the system's resources are "busy";
(d) it must allow a given processor to maintain bus control, that is to "hold" onto the bus, once access has been granted, until the processor deactivates its bus access request;
(e) the arbitration system must not slow down processor operations relative to system bus access.

The arbitration circuitry or "Arbiter" described in this disclosure provides for each of the above elements in addition to providing certain other useful and important features. These are:

(f) It provides two levels of bus access requests from each processor, thus allowing different cycle types to have a different bus access priority;
(g) it provides special arbitration rules when error conditions occur.

Figure 1:
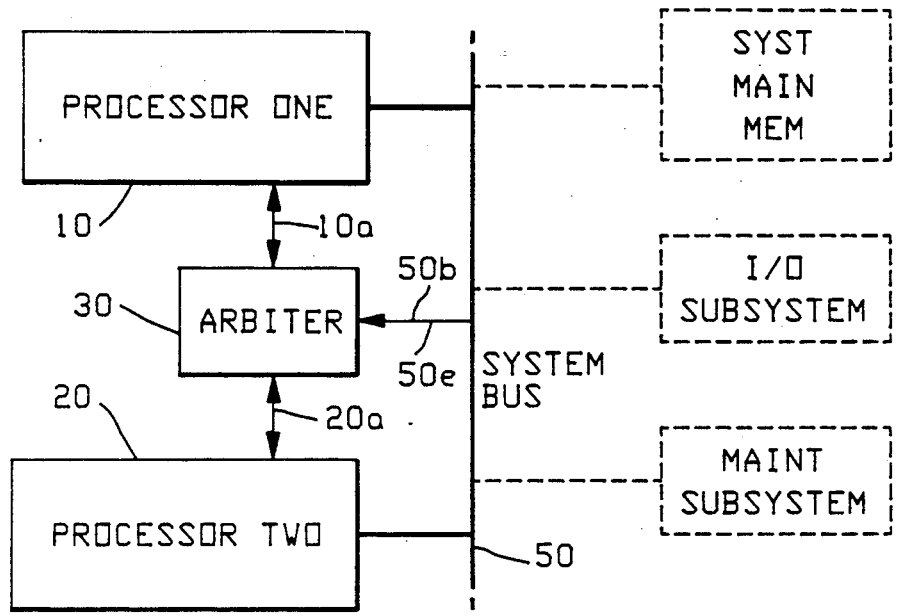
FIG. 1 showing a single computer module which contains two processors sharing a single path to the system bus.
Figure 2:
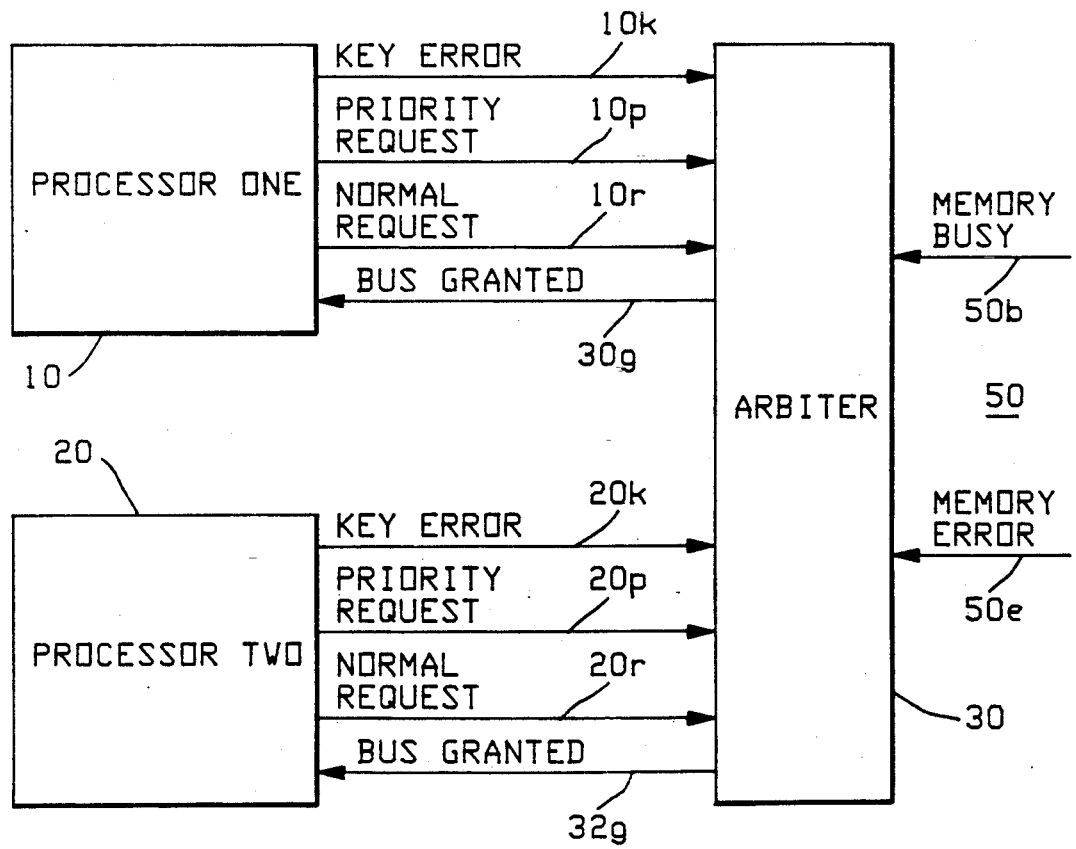
FIG. 2 is a diagram showing the relationship of the arbitration circuitry with the two processors involved together with the interface signals to the arbitration circuitry from each processor and from the system bus interface.

FIG. 1 shows a first processor 10 and a second processor 20 connected to a commonly shared system bus 50. Interposed and interconnected to each one of the processors is the arbitration circuitry designated Arbiter 30. A bus connection $10_a$ connects the first processor 10 to the Arbiter 30 while a second bus $20_a$ connects the second processor 20 to the Arbiter 30. FIG. 2 shows a processor 10 having certain output lines to the Arbiter 30. These include the key error line $10_k$, the priority request line $10_p$ and the normal request line $10_r$. The Arbiter provides a bus granted line $30_g$ to the processor 10.

Likewise, processor 20 has an output line designated $20_k$ for key error in addition to the priority request line $20_p$ and the normal request line $20_r$ which lines feed to the Arbiter 30. The Arbiter 30 presents a bus granted line $32_g$ from the Arbiter to the processor 20.

The Arbiter 30 receives signals from the system bus which are shown as the memory busy line $50_b$ and the memory error line $50_e$.

Each processor, 10 and 20, provides two request signals to the Arbiter 30. For processor 10, these are (i) normal access requests $10_r$ (NREQ), and (ii) priority access requests $10_p$ PREQ).

Likewise, for processor 20, these would involve the priority request line $20_p$ and the normal request line $20_r$.

The normal access request lines ($10_r$ and $20_r$) are used for "normal" bus accesses. These include reading and writing of the system main memory and for communications to and from the system maintenance interface subsystem as seen in the dotted lines of FIG. 1.

The priority access request lines $10_p$ and $20_p$ are used for all input/output (I/0) operations between the processor and the I/0 subsystem. The priority requests have higher access priority over any simultaneous "normal access requests" from the processor.

The arbitration circuitry of Arbiter 30 forms and provides a single bus output called the Bus Granted Signal on line $30_g$ and $32_g$ (BUSGNT) to each processor. This signal, when "active" informs the particular processor that it has total control of the bus and may, therefor, drive and receive information over it. It is the logic involved in the arbitration circuitry that is the heart and soul of the Arbiter 30. This logic which is shown in Tables I and II will meet all the requirements and features previously stated as desirable for this type of computer system configuration.

The Tables I and II indicate the detailed logic equations involved for the Bus Granted Signals involved for the two processors 10 and 20. It should be noted that all the logic for these equations is implemented in a single PAL chip.

In Tables I and II there are seen the equations for two of the BUS GRANTED terms, also for the two INHIBITS terms, for the two GRANTED HOLD flip-flops (Table II), and for one TOGGLE flip-flop (TFF). As seen in Tables I and II, there are dual sets of equations so that there is one equation for each processor. Both equations are identical except the numbers "1" or "2" are reversed, depending upon which processor equation is involved.

For ease of discussion, only the first processor (10) equations will be specifically discussed.

In the BUS GRANTED equations shown in Table I, each of the lines are numbered and lines (1) to (4) are bus request terms, while line (5) is a "hold" term once the bus has been granted.

The first desired requirement of the Arbiter 30 which was discussed earlier as paragraph (a) is that simultaneous access to both processors is never granted. It should be noted that, in Table I, the lines (1) to (4), the BUSGNTx/ signal of the other processor involved prevents this possibility. Thus, the only possible conditions are that either BUSGNT1 is "on" or else BUSGNT2 is "on" or both are "off", but never is there a situation where both are "on".

In Table I, the lines (1) and (2) are Priority Requests terms. Line (1) is the case when only this particular processor is making a Priority Request. In this particular case, the bus 50 is immediately granted (as long as no Inhibit condition is active).

Line (2) is the case when both processors are making Priority Requests at the same time. In this situation, both Arbiter requirements (a) and (b) must be fulfilled and this is provided by the TOGGLE flip-flop which provides this control. When this flip-flop (TFF) is "off", then processor one (10) is granted the bus 50; when this flip-flop is "on", then second processor (20) is granted the bus.

In Table I, the lines (3) and (4) are the Normal Request terms. Line (3) is the case when only a first processor (10) is making a Normal Request and the second processor (20) is not making a Normal or Priority Request.

Line (4) is the case of simultaneous Normal Requests from both processors (10 and 20), but with neither one making a Priority Request. In this situation, the arbitration is determined by the TOGGLE flip-flop, Table II, and FIG. 2B, (TFF). Note that for Priority Requests the Priority Requests, will always have precedence over Normal Requests and this fulfills the feature which was previously designated in paragraph (f).

Figure 2A:
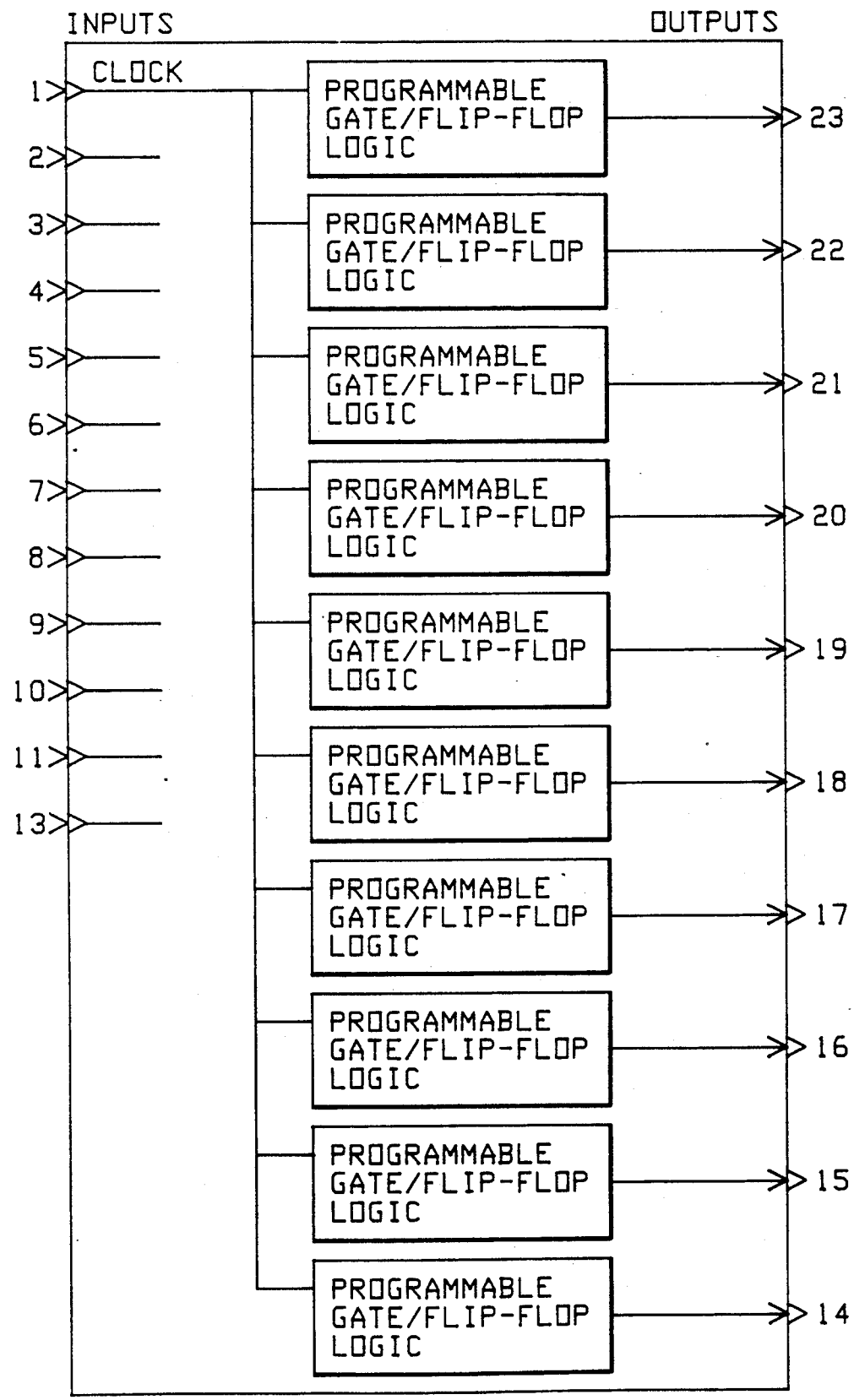
FIG. 2A illustrates an unprogrammed generic type PAL chip.
Figure 2B:
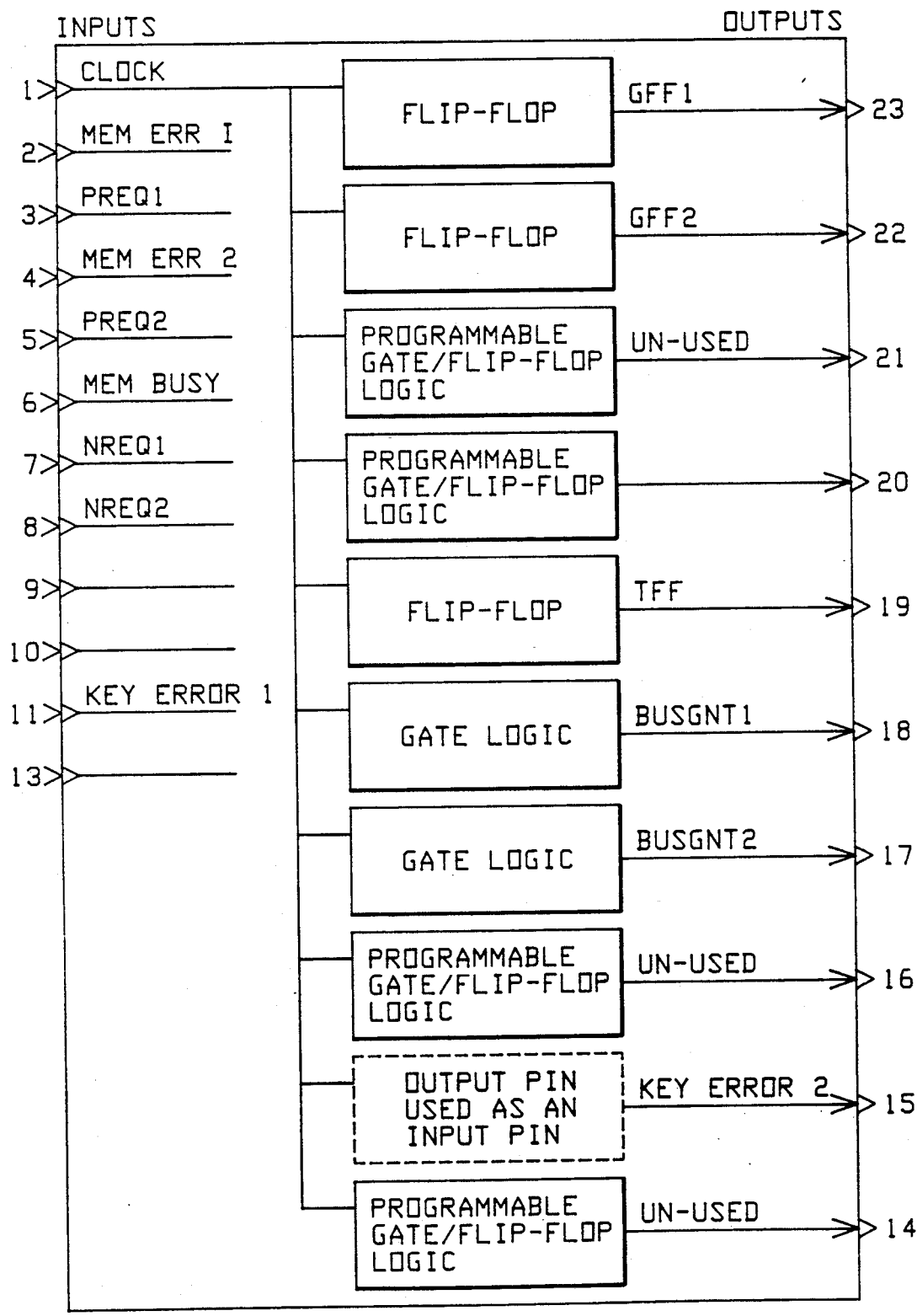
FIG. 2B illustrates a programmed PAL chip as used for the arbitration circuitry.

In Table I, line 5, there is seen the "hold" term. This line fulfills the requirement of the previous paragraph (d) of allowing a processor to maintain bus control. Once the arbitration of the lines (1) to (4) has been decided, and either the signal BUSGNT1 or the BUSGNT2 has been activated, then the appropriate GRANTED HOLD flip-flop, FIG. 2B is set. This flip-flop (Table II) will hold on the Bus Granted signal until the processor involved drops it's request signal.

In Table II, there is seen the first processor (10) Bus Granted Hold flip-flop equations. This flip-flop (GFF1) follows its $BUSGNT_x$ signal. It should be noted in line 14, Table II, that the possibility of both flip-flops being simultaneously set is prevented by the term BUSGNTx/ of the "other processor" in the set equation for the bus granted flip-flop, GFF1, FIG. 2B.

In Table I, the GRANTED HOLD flip-flop (GFF1) of line (5) is required because of the Inhibit conditions of line (7) of Table I. The Inhibit conditions of line (6) will become active after a bus cycle has been started. The Inhibit conditions and the Error conditions are shown in line (6) and (7). These show the conditions that can inhibit a processors access to the bus being granted. It may be noted that this Inhibit term appears in each one of the four request lines (1) to (4) of the BUSGNTx.

The TOGGLE flip-flop (Table II) (TFF) resolves the simultaneous request situations and also the possible "starvation of access" problem. Line (8) is the normal "SET" term. The flip-flop sets on the clock following the first processor (10) having had control of the bus and then having relinquished it.

Line (11) is the normal "RESET" term. The flip-flop resets on the clock following the second processor (20) having had control of the bus and then having relinquished it.

The lines of Table II designated line (9), (10), (12), and (13) are "error conditions". These show the conditions that can inhibit processor access to the bus 50, i.e. no access being granted.

Note that in Table I and II, there are certain logical signals used such that the "*" refers to the logical AND; the "+" refers to the logical OR, and the "/" refers to the logical NOT.

Referring to FIG. 2, there is seen the memory busy line $50_b$. Thus, if the system bus resources are "busy", the signal Memory BUSY will be "on". If this is "on" at the time of a processor request, then access to the bus will not be allowed, and will be inhibited until the memory in "not busy". This particular item fulfills the requirements and provision of paragraph (c); denial of access to the bus by either processor if the system resources are busy.

Note that after bus access has been granted and the processor has begun a system bus 50 operation, the bus may again then go "busy". This is the reason for the inclusion of the "GRANTED HOLD" flip-flop (GFF1) previously described in connection with Table I, line 5.

The arbitration circuitry system of the "Arbiter 30" described herein is to fulfill the requirements of the former paragraph (g) regarding special arbitration rules when error conditions occur. When these error conditions occur, the access granted feature is "inhibited" depending upon the error type. There are two error types which are detected for each processor and these error types involve:

(i) MEMORY ERROR: here the system main memory has detected an "uncorrectable" error condition on an operation by this particular processor. There is a separate memory error for each of the processors involved;

(ii) KEY ERROR: this is a special error condition detected which depends upon several different error situations, as for example, an illegal address region has been accessed. Again, there is a separate KEY ERROR for each of the processors involved.

The Arbiter 30 controls access to the bus 50 differently for each of these error types. It may be noted that if the second processor (20) has incurred a MEMORY ERROR 2, then first processor (10) cannot access the system bus 50. The INHIBIT 1 is "active".

This condition is most important to a multiprocessor-processor operation for two reasons. First, the processor that caused the error (in this case, the second processor 20) must be allowed immediate bus access to correct and cancel out the error condition in the main memory. It does this by reading the "ERROR LOG" in system memory.

Second, the other processor may think it caused the memory error if it did not do so. It must not be allowed bus access until the memory (main memory) has had it's error condition cleared out.

Referring to line (7) of Table I, a direct corresponding condition for the second processor (20) bus access, INHIBIT 2 is given which is the same as described in the previous paragraph for the first processor (10).

Referring to Table I, line 6, it will be noted that if KEY ERROR 1 has been caused by first processor (10), then further bus accesses by this processor are inhibited until its internal error correction software has reported and then cleared this condition. Thus, this type of special control is important to multiprocessor systems. It allows the nonfailing processor (processor 20) to continue to work and to have system bus access while the failing processor (processor 10) must first internally follow error procedures before being again allowed to touch main memory.

Referring to Table I, line 7, a direct corresponding condition for the second processor (20) bus access, INHIBIT 2, is provided for, as discussed in the situation for the first processor (10).

TABLE I

| BUS GRANTED EQUATIONS | | |
|---|---|---|
| BUSGNT1 = | (Processor 1) | LINE |
| PREQ1 * PREQ2/ * BUSGNT2/ * INHIBIT1/ | | (1) |
| + PREQ1 * PREQ2 * BUSGNT2/ * INHIBIT1/ * TFF/ | | (2) |
| + NREQ1 * PREQ2/ * NREQ2/ * BUSGNT2/ * INHIBIT1/ | | (3) |
| + NREQ1 * PREQ2/ * NREQ2 * BUSGNT2/ * INHIBIT1/ * TBB | | (4) |
| + GFF1 * (PREQ1 + NREQ1) | | (5) |
| BUSGNT2 = | (Processor 2) | Line |
| PREQ2 * PREQ1/ * BUSGNT1/ * INHIBIT2/ | | (1) |
| + PREQ2 * PREQ1 * BUSGNT1/ * INHIBIT2/ * TFF | | (2) |
| + NREQ2 * PREQ1/ * NREQ1/ * BUSGNT1/ * INHIBIT2/ | | (3) |
| + NREQ2 * PREQ1/ * NREQ1 * BUSGNT1/ * INHIBIT2/ * TFF | | (4) |
| + GFF2 * (PREQ2 + NREQ2) | | (5) |
| INHIBIT1 = MEMORY BUSY + MEMORY ERROR 2 + KEY ERROR 1 | | (6) |
| INHIBIT2 = MEMORY BUSY + MEMORY ERROR 1 + KEY ERROR 2 | | (7) |

Symbols used:
*logical and
+ logical or
/ logical not

TABLE II

| ARBITER CONTROL FLIP FLOPS | | | | |
|---|---|---|---|---|
| | | | | LINE |
| TOGGLE FLIP-FLOP: | | | | |
| TFF: | | | | |
| | SET | = | BUSGNT1/ * GFF1 | (8) |
| | | + | BUSGNT1/ * KEY ERROR 1 | (9) |
| | | + | BUSGNT1/ * MEMORY ERROR 2 | (10) |
| | RESET | = | BUSGNT2/ * GFF2 | (11) |
| | | + | BUSGNT2/ * KEY ERROR 2 | (12) |
| | | + | BUSGNT2/ *MEMORY ERROR 1 | (13) |
| PROCESSOR 1 BUS GRANTED HOLD FLIP-FLOP: | | | | |
| GFF1: | | | | |
| | SET | = | BUSGNT1 * BUSGNT2/ | (14) |
| | RESET | = | BUSGNT1/ | (15) |
| PROCESSOR 2 BUS GRANTED HOLD FLIP-FLOP: | | | | |
| GFF2: | | | | |
| | SET | = | BUSGNT2 * BUSGNT1/ | (14) |
| | RESET | = | BUSGNT2/ | (15) |

Symbols used:
*logical and
+ logical or
/ logical not

The multiprocessor multifunction arbitration system described herein presents a simple design implemented on a single, off-the-shelf chip. This architecture is quickly "reprogrammable" during the debugging in order to provide flexibility. FIG. 2A schematically shows an unprogrammed chip while FIG. 2B illustrates the programmed architecture for the arbitration circuitry.

The system involves one Arbiter 30 for each two processors. Each requesting processor has two software request modes or signals. The first is the NORMAL REQUEST and the second is the PRIORITY REQUEST. The processor microcode software specifies which mode is necessary for each cycle requested over the system bus. When there are simultaneous requests for the system bus 50, then the PRIORITY REQUEST signal always will take precedence over the NORMAL REQUEST signal.

If only one processor has activated a request signal, that is to say, there have not been simultaneous requests, then the requesting processor is given immediate control access to the system bus 50.

The Arbiter 30 itself monitors the "BUS-BUSY" condition and will prevent any bus access to any requestor until the bus is available. Thus, it is not necessary for each processor to be concerned with the state of the system bus 50.

The present arbitration circuitry system provides the special TOGGLE feature which prevents either processor from "hogging"] or monopolizing the bus accesses away from the other processor involved. In this situation, simultaneous requests of the same type from both processors 10 and 20 to the Arbiter 30 will activate the "TOGGLE" function. Thus, whichever processor last had control of the bus will give way to the other processor in granting the bus access request. In this fashion, each processor will be seen to always get an equal share of bus accessibility.

The described arbitration system provides three unique sets of arbitration rules within the single design. There is one set of arbitration rules for "normal operations" and there are two other sets of arbitration rules for the situation of handling special error operations. This is an unusually unique feature to this type of arbitration circuitry. It can change the rules in mid-stream due to the error conditions that may occur. This is a very critical item to efficient control in a multi-processor environment.

The following is a summary of the rules involved in the present arbitration circuitry system.

A. NORMAL RULES:
  When bus access is granted, the current bus controller (processor) maintains control over the bus and other requesters must wait.
  A priority request signal will defeat a NORMAL REQUEST signal.
  Simultaneous requests of the same type are resolved by the TOGGLE feature.

B. ERROR CONDITION 1 (MEMORY ERROR):
  A special memory error condition is detected by the Arbiter 30 on all memory cycles over the bus. If this condition occurs, then the other processor (the one that did not cause the error), is locked out from bus access until the current processor (having bus access) corrects the error problem. This special "lock out" does not require any error monitoring by software and is handled invisibly to the non-error involved processor which simply just waits for the next bus access capability.

C. ERROR CONDITION 2 (KEY ERROR):
  A second special error condition which is detected in other hardware such as a cache memory system, is also monitored by the Arbiter 30 itself. If this error condition occurs, then the Arbiter 30 immediately locks out the current processor (the one that caused the error) from bus access until the error has been corrected. This is critical to prevent the processor from corrupting data in main memory. While the errant processor is locked out, the second processor may continue its bus accesses as a normal operation.

These two error conditions (1) memory error and (2) key error are not the same and they each provide a unique and necessary control function.

The above-described rules are those which the Arbiter circuitry 30 handles for the processors and is a significant feature and problem solver of this design. Previous art systems often required that software would be used to make the controlling decisions and this would involve a much slower operation.

Presented herein has been a simple and vital piece of intercooperating logic for multiple processor computer systems, since bus sharing requires that some provision for bus arbitration be provided.

The bus arbitration circuitry provided herein is not only simple and of very low cost, but is providable on a single, small profile, 24-pin PAL chip. Additionally this system of bus arbitration will not slow down processor performance as is the case with many other systems. The arbitration circuitry of the Arbiter 30 described herein meets this and the other necessary conditions. The PAL chip used can grant the bus to a processor in a maximum of 15 nanoseconds while still providing all of the normal decisions and the featured arbitration decisions which were outlined hereinabove.

While the multiple processor arbitration circuitry described herein has been shown in one preferred embodiment, it is possible that other versions of the concepts provided herein may still be encompassed by the concepts involved and may fall within the attached claims defining this system.

What is claimed is:

1. A system for providing bus access arbitration and control for a least two processors sharing a common bus comprising:
  (a) a first processor means having bus access request lines and error notification lines connected to an arbiter logic means and including: (a1) connection means to a shared system bus;
  (b) a second processor means having bus access request lines and error notification lines connected to said arbiter logic means and including: (b1) connection means to said shared sytem bus;
  (c) shared system bus means for enabling connection of said processor means to system resource means;
  (d) said arbiter logic means for enabling access of said first or second processor means to said shared system bus means according to protocol implemented in a single programmable logic array unit, said protocol for setting two levels of bus access mechanisms wherein each first and each second level of bus access, functions, during moments of contention, to grant access to that processor which was least recently granted bus access, thus preventing monopoliztion of access by any one processor; said bus access mechanism including:
    (d1) first logic means to evaluate both said first level of normal bus-access requests and said second level or priority bus-access requests from said first and second processor means so as to grant bus access to that particular processor sending a priority bus-access request by generating a bus granted signal to the priority requesting processor means;

(d2) second logic means for detecting an error signal from a system resource means and locking out, from bus access, the processor means which was not involved in the error cycle until the original accessing processor means has corrected the error.

2. The system of claim 1 wherein said arbiter logic means provides said bus access mechanism protocol which includes:
 (a) third logic means for recognition of "simultaneous" bus access requests of equal level priority such that the last-processor means, holding bus granted access, will be denied next—access in favor of the other processor means.

3. The system of claim 1 wherein said arbiter logic means provides said bus access mechanism protocol which includes:
 (a) fourth logic means for granting bus access to the first requesting processor means sending, absent any priority requests, a normal request signal to said arbiter logic means by generating a bus granted signal to said first requesting processor means.

* * * * *